US009639176B2

(12) United States Patent
Micewicz et al.

(10) Patent No.: US 9,639,176 B2
(45) Date of Patent: May 2, 2017

(54) SYSTEM AND METHOD FOR BALANCING AN INPUT DEVICE

(71) Applicant: ADVANCED DIGITAL BROADCAST S.A., Chambesy (CH)

(72) Inventors: Jaroslaw Micewicz, Zielona Gora (PL); Adam Macugowski, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 437 days.

(21) Appl. No.: 14/489,513

(22) Filed: Sep. 18, 2014

(65) Prior Publication Data

US 2015/0088280 A1  Mar. 26, 2015
US 2017/0083113 A9  Mar. 23, 2017

(51) Int. Cl.
| | |
|---|---|
| *G06F 3/038* | (2013.01) |
| *G06F 3/0346* | (2013.01) |
| *G06F 3/01* | (2006.01) |
| *G06F 3/0354* | (2013.01) |

(52) U.S. Cl.
CPC ............ *G06F 3/0346* (2013.01); *G06F 3/016* (2013.01); *G06F 3/038* (2013.01); *G06F 3/0354* (2013.01)

(58) Field of Classification Search
CPC ...... G06F 3/0346; G06F 3/038; G06F 3/0354; G06F 3/016
USPC .......................................................... 700/61
See application file for complete search history.

(56) References Cited

U.S. PATENT DOCUMENTS

| | | | | |
|---|---|---|---|---|
| 6,697,043 | B1* | 2/2004 | Shahoian | A63F 13/06 345/156 |
| 2007/0150910 | A1* | 6/2007 | Shishido | G11B 17/028 720/701 |
| 2008/0141290 | A1* | 6/2008 | Shishido | F16F 15/366 720/651 |
| 2010/0039381 | A1* | 2/2010 | Cretella, Jr. | G06F 3/0317 345/158 |

(Continued)

OTHER PUBLICATIONS

Senkal et al, Pherical Brake with MR Fluid as Multi Degree of Freedom Actuator for Haptics, Journal of Intelligent Material Systems and Structures, vol. 20—Dec. 2009, pp. 2149-2160.*

*Primary Examiner* — Miranda Huang
*Assistant Examiner* — Olvin Lopez Alvarez
(74) *Attorney, Agent, or Firm* — Mark M. Friedman

(57) ABSTRACT

A system for balancing an input device, the system comprising: a spherical device having an outer spherical wall and an inner spherical wall the system further comprising: an internal circuitry module housing internal circuits and positioned in the center of the spherical device and balanced in the center in order hold the spherical device still on a flat surface; a cavity formed between the outer spherical wall and the inner spherical wall; a rheological fluid disposed in the cavity wherein the volume of the rheological fluid is below 50% of the volume of the cavity and such that the weight of the rheological fluid is above the weight of the spherical device without the rheological fluid; wherein al least one of the outer spherical wall and the inner spherical wall comprises a rheological fluid activation means configured to change the state of the rheological fluid; and a rheological fluid activation controller configured to control the rheological fluid activation means in response to occurrence of a predefined condition so that the spherical device may switch between a free rolling state and a fixed state.

12 Claims, 4 Drawing Sheets

(56) References Cited

U.S. PATENT DOCUMENTS

Figure 1A:
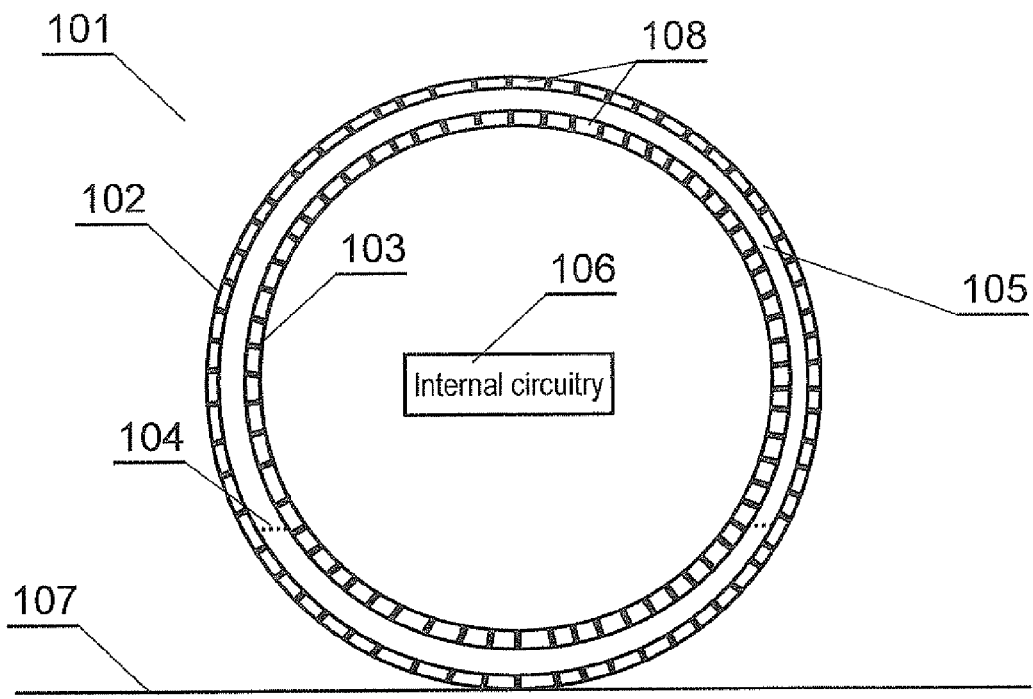

2012/0154267 A1* 6/2012 Albano ............... G06F 3/0346
345/156
2013/0213756 A1* 8/2013 Nara ..................... F16D 3/80
192/21.5

* cited by examiner

SYSTEM AND METHOD FOR BALANCING AN INPUT DEVICE

The present invention relates to system and method for balancing an input device such as a computer input device.

According to Wikipedia, in computing, an input device is any peripheral (piece of computer hardware equipment) used to provide data and control signals to an information processing system such as a computer or other information appliance. Examples of input devices include keyboards, mouse, scanners, digital cameras and joysticks.

There is a subgroup of pointing devices, which are input devices used to specify a position in space. Examples involving indirect input include mouse and trackball.

Prior art publication of US 20100039381 A1 entitled "Rotatable input device" discloses a computer mouse that includes a surface tracking sensor that detects movement of the computer mouse along the support surface. Additionally included are one or more orientation sensors that detect a movement of the computer mouse relative to a pivot point. The computer mouse also includes a controller that is configured to translate the movement along the support surface into a two-dimensional coordinate and to translate the movement relative to the pivot point into a magnitude of rotation.

The '381 publication presents the bottom surface of the mouse having a rounded shape in the form of a half oval. As a result of this rounded bottom, the mouse can "roll" relative to the support surface or relative to the mouse pivot point.

Additionally, an orientation sensor is configured to detect a rotational movement of the mouse relative to one or more pivot points. That is, the orientation sensor is configured to detect the roll, pitch, and/or yaw of the mouse. A variety of orientation sensors may be used to detect such rotational movements. An example of an orientation sensor is a gyroscope used for measuring orientation or rotation based on detection of angular momentum. An example of a gyroscope is a vibrating structure gyroscope embodied in a micro electro-mechanical systems (MEMS) device. Another example of a gyroscope is a rotating gyroscope used to detect relative angular displacements and angular rates, which may be translated into a rotation of the mouse.

The drawback of the '381 solution is that the mouse is only half oval, which reduces movement possibilities, especially roll, pitch, and/or yaw of the mouse.

Moreover, the '381 defines such rounding that as any suitable degree needed to achieve a desired balance between stability of the mouse in an upright orientation, and ease of rolling the mouse.

Thus a difficulty and unaddressed need is disclosed in '381 that precludes substantially spherical shapes of the mouse due to difficulties in achieving mouse balance and possibility of rolling off an inclined surface. From the viewpoint of a user, the balance must be present and the mouse (or an input device in general) needs to be resting on the desk, not self-rotating and lying perfectly balanced.

It would be thus desirable to provide method and system for balancing an input device. Preferably such balancing system would be applicable for substantially spherical or spherical input devices such as spherical computer mouse.

The object of the present invention is a system for balancing an input device, the system comprising: a spherical device having an outer spherical wall and an inner spherical wall the system further comprises: an internal circuitry module housing internal circuits and positioned in the center of the spherical device and balanced in the center in order hold the spherical device still on a flat surface; a cavity formed between the outer spherical wall and the inner spherical wall; a rheological fluid disposed in the cavity wherein the volume of the rheological fluid is below 50% of the volume of the cavity and such that the weight of the rheological fluid is above the weight of the spherical device without the rheological fluid; wherein at least one of the outer spherical wall and the inner spherical wall comprises a rheological fluid activation means configured to change the state of the rheological fluid; and a rheological fluid activation controller configured to control the rheological fluid activation means in response to occurrence of a predefined condition so that the spherical device may switch between a free rolling state and a fixed state.

Preferably, the rheological fluid is an electrorheological fluid or a megnetorheological fluid.

Preferably, in case of the electrorheological fluid the activation means are electrodes, while in case of the magnetorheological fluid the activation means are coils.

Preferably, there are 8 activation means per perimeter on the inner wall and/or the outer wall.

Preferably, the spherical device comprises an accelerometer based on the output of which the rheological fluid activation controller will determine which subset of the activation means shall be activated depending on the position of the spherical device.

Preferably, the activation means are positioned adjacent each other.

Preferably, the activation means are spread by a distance between them.

Preferably, based on a vector of acceleration, determined from the output of the accelerometer, rheological fluid activation controller determines which activation means shall be activated in order to balance the spherical device.

Preferably, the predefined condition is presence of an operators hand on the spherical device or lack thereof determined by an operator's hand detector configured to indicate whether an operator is holding the spherical device.

Another object of the present invention is a method for balancing an input device, according to the present invention, the method comprising the steps of: awaiting detection of an operator's hand by the operator's hand detector; allowing a free flow of the rheological fluid within the cavity by instructing the rheological fluid activation controller to deactivate all activation means; awaiting detection of lack of contact with the operator's hand by the operator's hand detector; instructing the rheological fluid activation controller to activate selected activation means in order to make the rheological fluid solid.

Another object of the present invention is a computer program comprising program code means for performing all the steps of the method according to the present invention when said program is run on a computer.

Another object of the present invention is a computer readable medium storing computer-executable instructions performing all the steps of the method according to the present invention when executed on a computer.

Figure 1B:
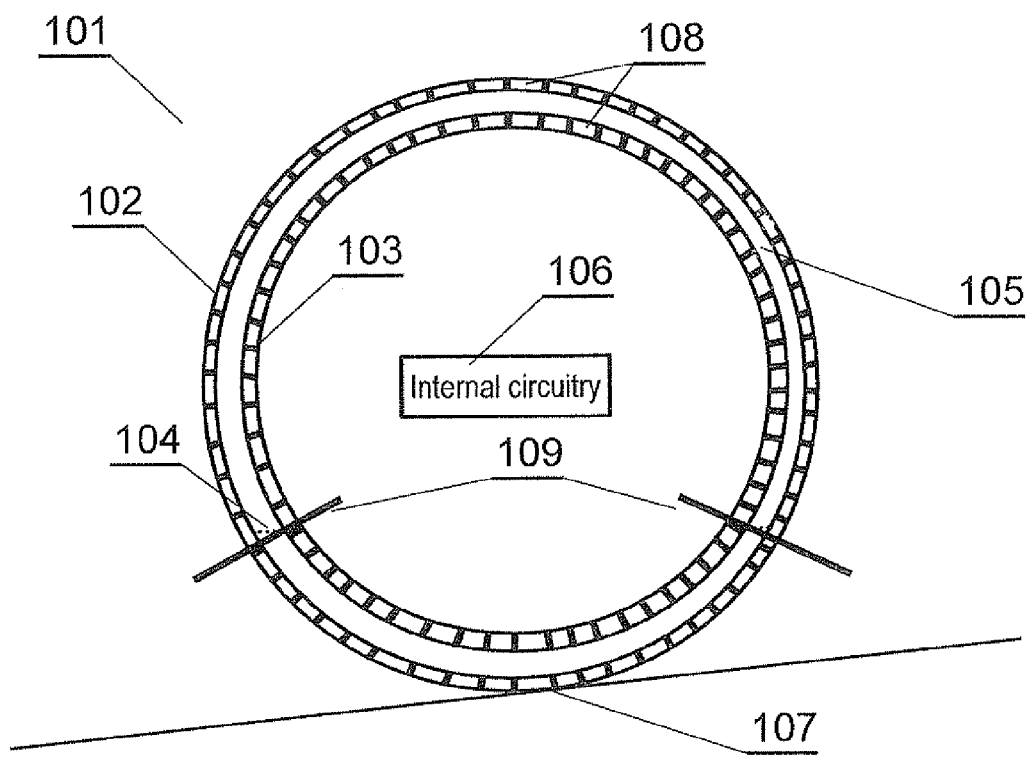
Figure 2A:
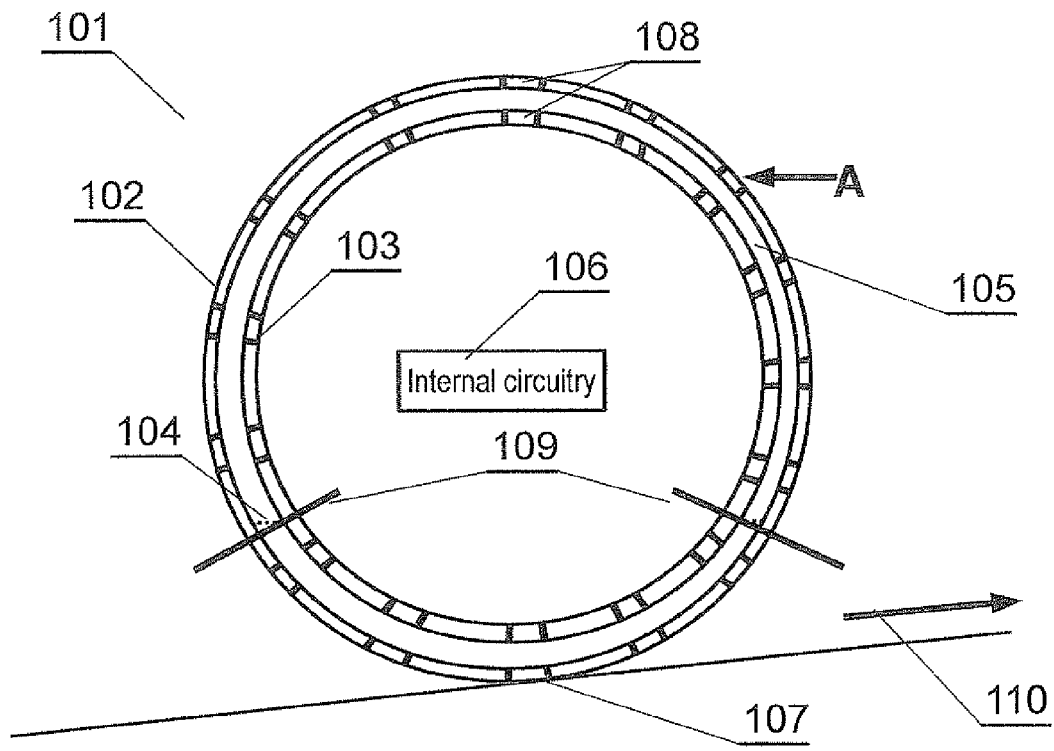
Figure 2B:
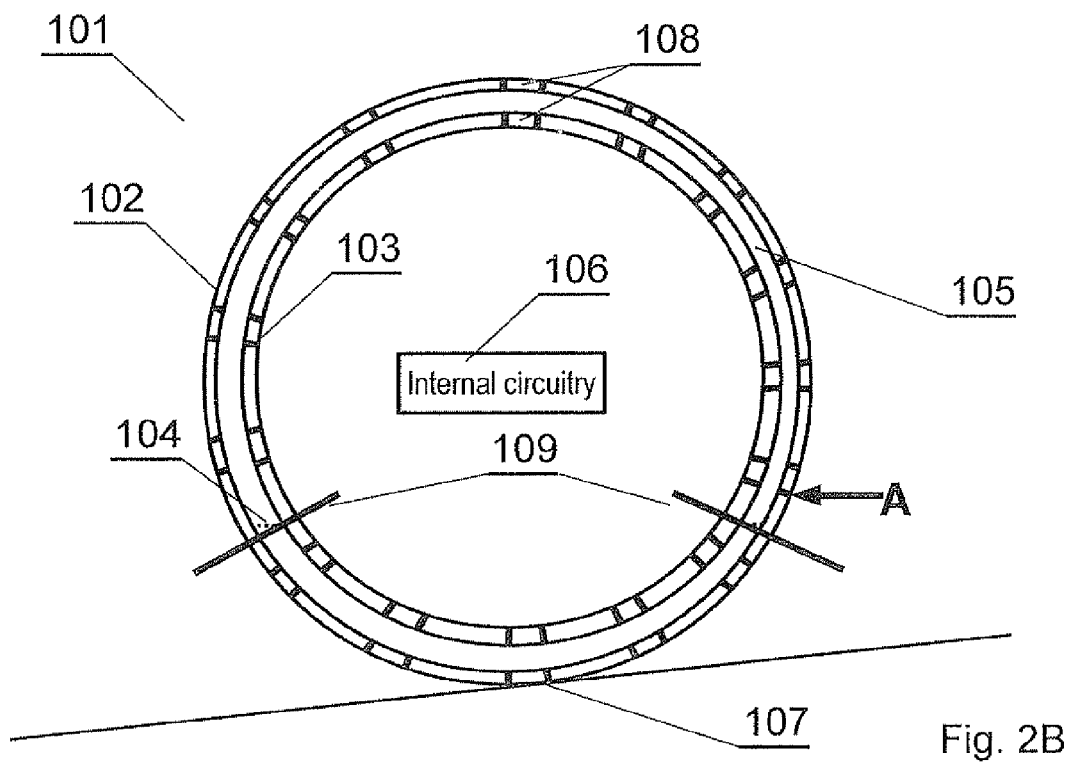
Figure 3:
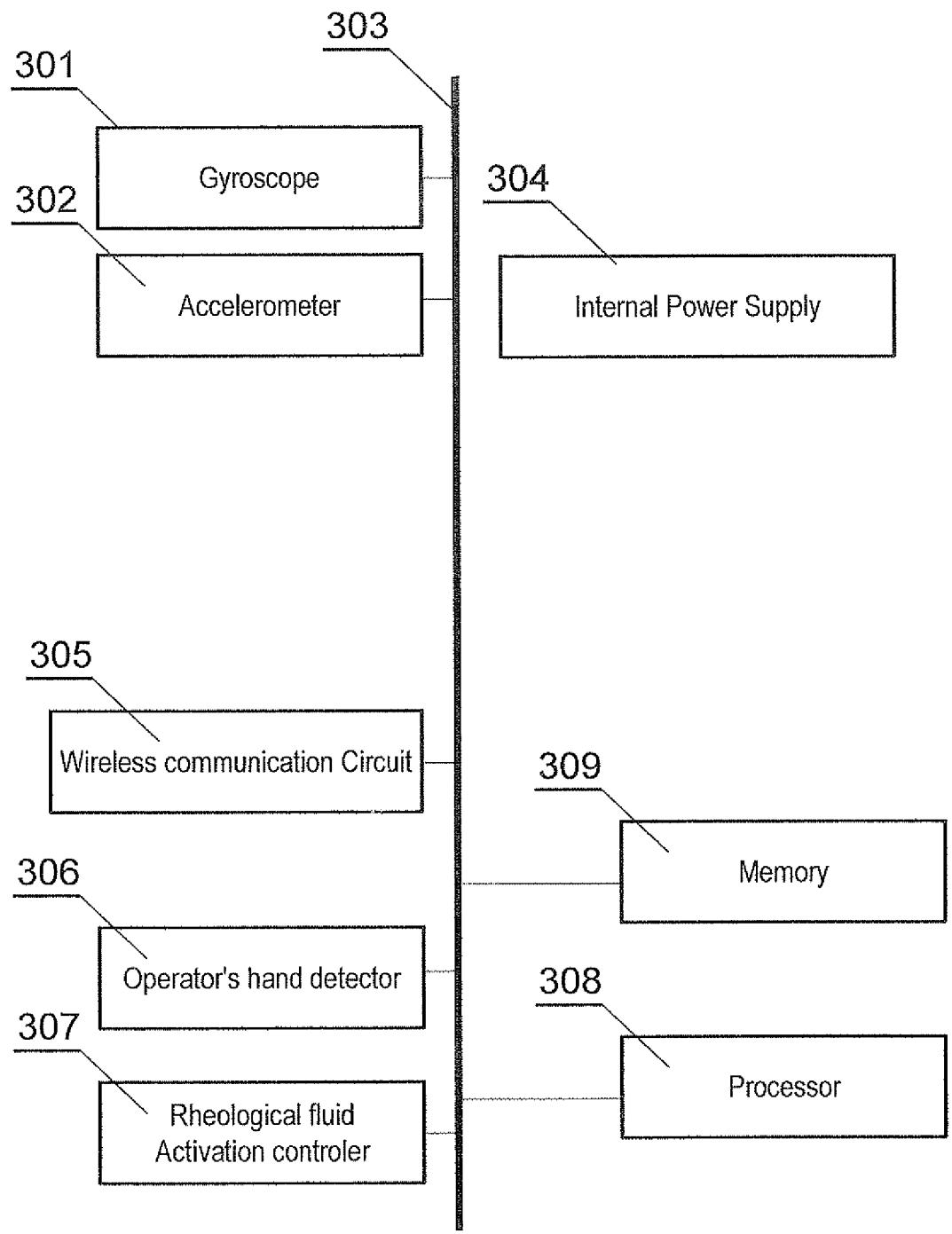
Figure 4:
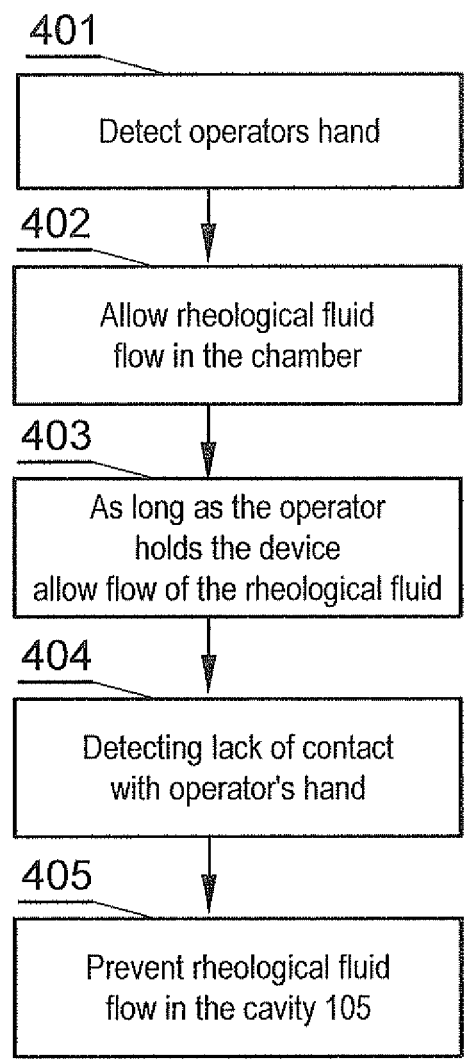

The present invention is shown by means of exemplary embodiments on a drawing, in which:

FIGS. 1A and 1B present a schematic diagram of a system according to the present invention;

FIGS. 2A and 2B present behavior of the system after movement of the input device;

FIG. 3 presents a schematic overview of internal circuits of the system; and FIG. 4 shows a method according to the present invention.

FIGS. 1A and 1B present a schematic diagram of a system according to the present invention. The input device 101, having a form of a sphere, is resting on a flat surface 107 in FIG. 1A. The device 101 comprises an internal circuitry module 106 housing internal circuits, more details of which are presented in FIG. 3.

The internal circuitry module is positioned in the center of the sphere 101 and needs to be balanced in the center not to cause movement of the device 101 on a flat surface (Or in positive terms in order to hold the spherical device 101 still on a flat surface).

The device 101 comprises an outer wall 102 and an inner wall 103, which create a cavity 105 in which a rheological fluid 104 is disposed. Preferably, the smaller the distance between the outer wall 102 and the inner wall 103 the better. The outer wall 102 and the inner wall 103 have a spherical shape and in a preferred embodiment the inner wall 103 is kept at a fixed distance from the outer wall 102 by means of at least one distance element (not shown in the drawing).

The volume of the rheological fluid shall be as low as possible while keeping its weight above the weight of the device 101 when not filled with the rheological fluid. Preferably, the rheological fluid should be as heavy as possible per cubic centimeter. Additionally, preferably the volume of the rheological fluid is below 50% of the volume of the cavity 105.

The rheological fluid may be an electrorheological fluid or a megnetorheological fluid both known in the prior art. Electrorheological (ER) fluids are suspensions of extremely fine non-conducting particles (up to 50 micrometers diameter) in an electrically insulating fluid. The apparent viscosity of these fluids changes reversibly by an order of up to 100,000 in response to an electric field. A magnetorheological fluid (MR fluid) is a type of smart fluid in a carrier fluid, usually a type of oil. When subjected to a magnetic field, the fluid greatly increases its apparent viscosity, to the point of becoming a viscoelastic solid.

The outer wall 102 and/or the inner wall 103 has a plurality of rheological fluid activation means 108 thereon or molded therein for example embedded in a plastic casing. The rheological fluid activation means 108 are configured to change the state of the rheological fluid (between liquid and solid). In case of electrorheological fluid the activation means 108 are electrodes, while in case of magnetorheological fluid the activation means 108 are coils. Preferably, with a use of an accelerometer the internal circuitry 106 will determine which subset of the activation means 108 shall be activated depending on the position of the device 101.

In case only one of the outer wall 102 and the inner wall 103 has a plurality of rheological fluid activation means 108 the magnetorheological fluid is to be used.

In another embodiment the activation means 108 may be spread by a distance between them and not be positioned adjacent as shown for example in FIG. 1A. It has been found that 8 activation means 108 are sufficient per perimeter on the inner wall 103 and the outer wall 102. Naturally there are numerous perimeters on a sphere.

In another embodiment, applicable only to electrorheological fluid there is only one activation means on the outer wall (a first electrode) and another activation means on the inner wall (a second electrode). The voltage between the electrodes will control the state of the electrorheological fluid.

FIG. 1B presents a schematic diagram of a system according to the present invention wherein the device 101 has been positioned on an inclined surface 107. The device 101 is not operated by an operator, therefore based on readings of the accelerometer i.e. a vector of acceleration the system determines which activation means 108 shall be activated in order to balance the device 101. In this example the activation means 108 indicated by the 109 indicator have been activated in order to make the rheological fluid solid and balance the device 101 so that it does not roll off the inclined surface 107. The remaining activation means 108 may stay inactive in order to decrease power consumption.

FIGS. 2A and 2B present behavior of the system after movement of the input device. As can be easily seen there are fewer activation means 108 in this exemplary embodiment.

The device 101 rests in a balanced state on an inclined surface 107 and the selected 109 activation means 108 are active. An arbitrarily selected point A has been identified on the sphere. The indicator 101 denotes that an operator holds the device 101 the activation means 108 are released and the operator may move the device 101 with ease in the direction 110. Once the operator rolls the device 101 and releases its touch, the device 101 will activate different 109 activation means 108 in order to keep the device 101 balanced on the same inclined surface 107.

FIG. 3 presents a schematic overview of the internal circuits of the system. The processor 308 utilizes the memory 309 and software stored therein to control the remaining elements of the system. The communication is effected by means of a data bus 303 but in other embodiments the internal circuits may communicate directly without utilizing a common data bus 303. The internal power supply 304 supplies the device with power, preferably from a battery power source. The proposed way of battery charging is to use induction charger to avoid need of plugging external power cable and avoid any external sockets on the device 101 that could alter the balance of the device 101.

The component responsible for providing coordinates information is the gyroscope 301 and the component that provides input to the rheological fluid activation controller 307 is an accelerometer 302.

The device 101 may wirelessly communicate with the controlled device such as a personal computer, by means of a wireless communication circuit 305 (eg. Bluetooth link).

The system also comprises an operator's hand detector 306 configured to indicate whether an operator is holding the device 101 in such a manner that would facilitate its efficient use, for example operator's palm should be resting on the device 101. The extent of such detection may be user dependent. The detection itself may for example be implemented with a touch sensor in a form of capacitive sensor detecting touch. The same capacitive touch sensor may be responsible for detecting user's clicks, double-clicks etc.

The most important circuit of the system is the rheological fluid activation controller 307, which based on the input from the accelerometer 302 determined which activation means 108 are to be activated in the current position of the device 101. Preferably, the level of the rheological fluid is also taken into account by the rheological fluid activation controller 307 when determining which activation means should be activated.

In case when there are only two activation means when electrorheological fluid is used, the input of the accelerometer 302 is not required as a part of the determination.

FIG. 4 shows a method according to the present invention. The method starts at step 401 where the system awaits detection of an operator's hand by the operator's hand detector 306 (There may be other predefined conditions required for the rheological fluid activation controller 307 to control the rheological fluid activation means 108) so that the spherical device 101 may switch between a free rolling state and a fixed state and vice versa.

In case the operator's hand is detected on the device 101, at step 402 the systems allows a free flow of the rheological fluid within the cavity 105 i.e. the rheological fluid activation controller 307 deactivates all activation means 108.

As long as the operator holds the device 101, the system allows free flow of the rheological fluid 403. When the operator's hand detector 306 detects 404 that the operator has released the device 101, it preferably immediately notifies the rheological fluid activation controller 307 that activates selected activation means 108 in order to make the rheological fluid solid 405 in the cavity 105. The rheological fluid activation controller 307 may take into account the input from the accelerator 302 and the amount/level of rheological fluid that may be stored as a parameter in the memory 309.

The advantages of the present invention utilizing a gyroscope-based input device having a spherical shape are that the wrist and arm of a user will be resting on a stable surface, avoiding unwanted stress on hand's muscles, more precise when manipulating on small icons or checkboxes of a Graphical User Interface, the device can be used on various rough surfaces, clothes, couches etc not suitable for example for optical devices.

Additionally, the automatic, adaptive balancing of an input device 101, according to the present invention, avoids unwanted cursor movement or click when the input device 101 is in an idle state.

It can be easily recognized, by one skilled in the art, that the aforementioned method for balancing an input device may be performed and/or controlled by one or more computer programs. Such computer programs are typically executed by utilizing the computing resources of the device. The computer programs can be stored in a non-volatile memory, for example a flash memory or in a volatile memory, for example RAM and are executed by the processing unit. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

In addition, any combination of the appended claims in envisaged in the present application.

The invention claimed is:

1. A system for balancing an input device, the system comprising:
    a spherical device 101 having an outer spherical wall 102 and an inner spherical wall 103
the system being characterized in that it further comprises:
    an internal circuitry module 106 housing internal circuits and positioned in the center of the spherical device 101 and balanced in the center in order hold the spherical device 101 still on a flat surface;
    a cavity 105 formed between the outer spherical wall 102 and the inner spherical wall 103;
    a rheological fluid disposed in the cavity 105
        wherein the volume of the rheological fluid is below 50% of the volume of the cavity 105 and such that the weight of the rheological fluid is above the weight of the spherical device 101 without the rheological fluid;
        wherein at least one of the outer spherical wall 102 and the inner spherical wall 103 comprises a rheological fluid activation means 108 configured to change the state of the rheological fluid; and
    a rheological fluid activation controller 307 configured to control the rheological fluid activation means 108 in response to occurrence of a predefined condition so that the spherical device 101 may switch between a free rolling state and a fixed state.

2. The system according to claim 1, characterized in that the rheological fluid is an electrorheological fluid or a magnetorheological fluid.

3. The system according to claim 2, characterized in that in case of the electrorheological fluid the activation means 108 are electrodes, while in case of the magnetorheological fluid the activation means 108 are coils.

4. The system according to claim 1, characterized in that there are 8 activation means 108 per perimeter on the inner wall 103 or the outer wall 102.

5. The system according to claim 1, characterized in that the spherical device 101 comprises an accelerometer 302 based on an output of which the rheological fluid activation controller 307 will determine which subset of the activation means 108 shall be activated depending on a position of the spherical device 101.

6. The system according to claim 5, characterized in that based on a vector of acceleration, determined from the output of the accelerometer 302, rheological fluid activation controller 307 determines which activation means 108 shall be activated in order to balance the spherical device 101.

7. The system according to claim 1, characterized in that the activation means 108 are positioned adjacent each other.

8. The system according to claim 1, characterized in that the activation means 108 are spread by a distance between them.

9. The system according to claim 1, characterized in that the predefined condition is presence of an operator's hand on the spherical device 101 or lack thereof determined by an operator's hand detector 306 configured to indicate whether an operator is holding the spherical device 101.

10. Method for balancing an input device 101, according to claim 1, the method being characterized in that it comprises the steps of:
    awaiting 401 detection of an operator's hand by the operator's hand detector 306;
    allowing 402 a free flow of the rheological fluid within the cavity 105 by instructing the rheological fluid activation controller 307 to deactivate all activation means 108;
    awaiting 404 detection of lack of contact with the operator's hand by the operator's hand detector 306;
    instructing 405 the rheological fluid activation controller 307 to activate selected activation means 108 in order to make the rheological fluid solid.

11. A computer program comprising:
    program code means, stored in a non-transitory computer readable medium, for performing all the steps of the method according to claim 10 when said program is run on a computer.

12. A non-transitory computer readable medium storing computer-executable instructions performing all the steps of the method according to claim 10 when executed on a computer.

* * * * *